(12) United States Patent
Thurman et al.

(10) Patent No.: US 11,988,508 B1
(45) Date of Patent: May 21, 2024

(54) DIGITAL HOLOGRAPHIC TOMOGRAPHY TURBULENCE MEASUREMENTS

(71) Applicant: Lockheed Martin Corporation, Bethesda, MD (US)

(72) Inventors: Samuel Trent Thurman, Arvada, CO (US); Anthony Klee, Lafayette, CO (US); Thomas G. Alley, Broomfield, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 15 days.

(21) Appl. No.: 17/574,968

(22) Filed: Jan. 13, 2022

Related U.S. Application Data

(60) Provisional application No. 63/221,244, filed on Jul. 13, 2021, provisional application No. 63/137,785, filed on Jan. 15, 2021.

(51) Int. Cl.
| | | |
|---|---|---|
| *G01B 9/02* | (2022.01) | |
| *G01B 9/02091* | (2022.01) | |
| *G02B 5/18* | (2006.01) | |
| *G03H 1/04* | (2006.01) | |

(52) U.S. Cl.
CPC ..... *G01B 9/02091* (2013.01); *G01B 9/02044* (2013.01); *G02B 5/1814* (2013.01); *G03H 1/0443* (2013.01); *G03H 2001/045* (2013.01)

(58) Field of Classification Search
CPC ............ G01B 9/02091; G01B 9/02044; G01B 9/02027; G01B 9/02028; G01B 9/02047; G01B 9/0205; G01B 9/021; G01B 2290/30; G02B 5/1814; G01H 9/002; G03H 1/0443; G03H 2001/045; G01N 21/45
See application file for complete search history.

(56) References Cited

U.S. PATENT DOCUMENTS

| | | | |
|---|---|---|---|
| 10,416,609 B1 * | 9/2019 | Pellizzari | G03H 1/2202 |
| 2003/0023153 A1 * | 1/2003 | Izatt | G01B 9/02072 |
| | | | 600/407 |

(Continued)

OTHER PUBLICATIONS

Radosevich et al., "Dual wavefront sensing design for supersonic wind tunnel experiments," Proc. SPIE 10772, Unconventional and Indirect Imaging, Image Reconstruction, and Wavefront Sensing 2018, 1077209 (Sep. 18, 2018); https://doi.org/10.1117/12.2319867 (Year: 2018).*

(Continued)

*Primary Examiner* — Uzma Alam
*Assistant Examiner* — Jonathon Cook

(57) ABSTRACT

Localized measurement of turbulent airflows is provided using enhanced techniques of digital holography with computed tomography. In an implementation, an optical beam is diffracted to produce an array of signal beams which propagate at different angles through a test volume that includes a test article. A reference beam is optically interfered with the array of signal beams after propagating through the test volume, producing a corresponding array of holograms simultaneously detected by a single digital holographic sensor. Digitized versions of the holograms are processed to produce a signal field for each test beam. Computed tomography is then applied to the signal fields to determine path-resolved turbulence measurements.

20 Claims, 10 Drawing Sheets

(56) References Cited

U.S. PATENT DOCUMENTS

2009/0310118 A1* 12/2009 Halldorsson ............ G01S 17/95
356/28
2013/0314694 A1* 11/2013 Tchoryk, Jr. ............ G01S 17/58
356/28.5

OTHER PUBLICATIONS

Tomasz Kozacki, Rafał Krajewski, and Małgorzata Kujawińska, "Reconstruction of refractive-index distribution in off-axis digital holography optical diffraction tomographic system," Opt. Express 17, 13758-13767 (2009) (Year: 2009).*
B Timmerman and D W Watt 1995 Meas. Sci. Technol. 6 1270 DOI 10.1088/0957-0233/6/9/006 (Year: 1995).*
Mark F. Spencer, Robert A. Raynor, Matthias T. Banet, Dan K. Marker, "Deep-turbulence wavefront sensing using digital-holographic detection in the off-axis image plane recording geometry," Opt. Eng. 56(3) 031213 (Oct. 31, 2016) https://doi.org/10.1117/1.OE.56.3.031213 (Year: 2016).*
Werner et al "Combined measurement of silicon microbeams by grating interferometry and digital holography," Proc. SPIE 3407, International Conference on Applied Optical Metrology, (Sep. 29, 1998); https://doi.org/10.1117/12.323338 (Year: 1998).*
M. Paturzo, F. Merola, S. Grilli, S. De Nicola, A. Finizio, and P. Ferraro, "Super-resolution in digital holography by a two-dimensional dynamic phase grating," Opt. Express 16, 17107-17118 (2008) (Year: 2008).*
Klee, Anthony et al., "Digital Holographic Tomography For Path-Resolved Turbulence Measurements," Proceedings of SPIE, vol. 11836, pp. 118360F-1-118360F-12, Aug. 1, 2021.

* cited by examiner

DIGITAL HOLOGRAPHIC TOMOGRAPHY TURBULENCE MEASUREMENTS

RELATED APPLICATIONS

This application hereby claims the benefit of and priority to U.S. Provisional Patent Application 63/137,785, titled "DIGITAL HOLOGRAPHIC TOMOGRAPHY," filed Jan. 15, 2021, which is hereby incorporated by reference in its entirety. This application also hereby claims the benefit of and priority to U.S. Provisional Patent Application 63/221,244, titled "DIGITAL HOLOGRAPHIC TOMOGRAPHY," filed Jul. 13, 2021, which is hereby incorporated by reference in its entirety.

TECHNICAL BACKGROUND

Measurement of turbulence and aberrated optical wavefronts is a common need across a wide range of application areas, including astronomy, free space optical communications, intelligence, surveillance, and reconnaissance (ISR), directed energy (DE), and aeronautics. Many diagnostics exist to perform these measurements, but typically they only characterize a path-integrated turbulence and cannot resolve longitudinal variations in turbulence along the line of sight. Determination of longitudinal variation can be critical information for the precise turbulent flow analysis, the separation of layered turbulence around buildings or structures, or adaptive optic compensation of deep turbulence for DE and ISR.

Some measurement of turbulence and other aerodynamical effects is employed in wind tunnel testing. For example, wind tunnel experiments and testing are used to characterize the aerodynamic performance of test articles comprising aeronautic parts (e.g. aircraft designs and optical turret shapes). One goal of wind tunnel testing is to understand changes with both space and time in air density around a test article. Shack-Hartmann wavefront sensors are often used in wind tunnel measurements. The standard optical method is to use a single beam and a Shack-Hartmann wavefront sensor, which does not provide localized measurements for test articles. With a single beam, the test article measurements are usually contaminated by wavefront error contributions from boundary layer turbulence along the opposite side wall of the wind tunnel. It is desirable to make test article measurements free from this boundary layer contamination. Astronomical observation techniques can employ multi-conjugate adaptive optics that use a tomographic wavefront sensing approach, where multiple laser-guide stars are projected onto the upper atmosphere and multiple Shack-Hartmann wavefront sensors are used to record data. However, this astronomical approach is difficult to scale to a wind tunnel environment because the size and configuration of Shack-Hartmann wavefront sensors are prohibitive.

Overview

Wind tunnel experiments and testing can be used to characterize the aerodynamic performance of aeronautic parts modeled by test articles placed into an airflow. Discussed herein are enhanced techniques and elements for measurement of turbulence and other aerodynamical effects of test articles that model various aeronautic parts in wind tunnels or in other measurement systems. These enhanced techniques can be referred to as digital holography (DH) tomography (DHT), and comprise digital holography and computed tomography that enable path-resolved turbulence measurements. The techniques herein can use multiple beams for tomography that propagate at different angles and a digital holography wavefront sensor. The use of multi-beam tomographic measurements can isolate test article and boundary layer wavefront error contributions.

Localized measurement of turbulent airflows is provided using enhanced techniques of digital holography with computed tomography. In an implementation, an optical beam is diffracted to produce an array of signal beams which propagate at different angles through a test volume that includes a test article. A reference beam is optically interfered with the array of signal beams after propagating through the test volume, producing a corresponding array of holograms simultaneously detected by a single digital holographic sensor. Digitized versions of the holograms are processed to produce a signal field for each test beam. Computed tomography is then applied to the signal fields to determine path-resolved turbulence measurements.

In another implementation, an apparatus includes a laser system that generates a source beam and a reference beam, and a diffraction grating configured to generate multiple test beams from the source beam. The apparatus also includes input optic elements configured to direct the multiple test beams through a test volume containing a test article, and output optic elements configured to project the multiple test beams onto a detector for interference with the reference beam. The detector is configured to provide a digital representation of the interference to a processing system for measuring turbulence associated with at least the test article. Other measurement applications do not involve a test article, and instead comprise tomographic measurements of naturally occurring atmospheric turbulence in outdoor settings for phenomenology studies.

In yet another implementation, an apparatus includes one or more computer readable storage media, and program instructions stored on the one or more computer readable storage media. The program instructions are executable by a processing system to direct the processing system to at least receive a digital representation of an interference pattern generated by at least interfering a reference beam with multiple test beams that propagate at different angles through a test volume containing a test article. The program instructions also direct the processing system to process the digital representation and indications of the different angles to determine path-resolved turbulence measurements, and provide the path-resolved turbulence measurements associated with at least the test article.

This Overview is provided to introduce a selection of concepts in a simplified form that are further described below in the Detailed Description. This Overview is not intended to identify key features or essential features of the claimed subject matter, nor is it intended to be used as an aid in determining the scope of the claimed subject matter.

While multiple implementations are disclosed, still other implementations of the technology will become apparent to those skilled in the art from the following detailed description. As will be realized, aspects of the technology are capable of modifications, all without departing from the scope of the technology. Accordingly, the drawings and detailed description are to be regarded as illustrative in nature and not restrictive.

Figure 1:
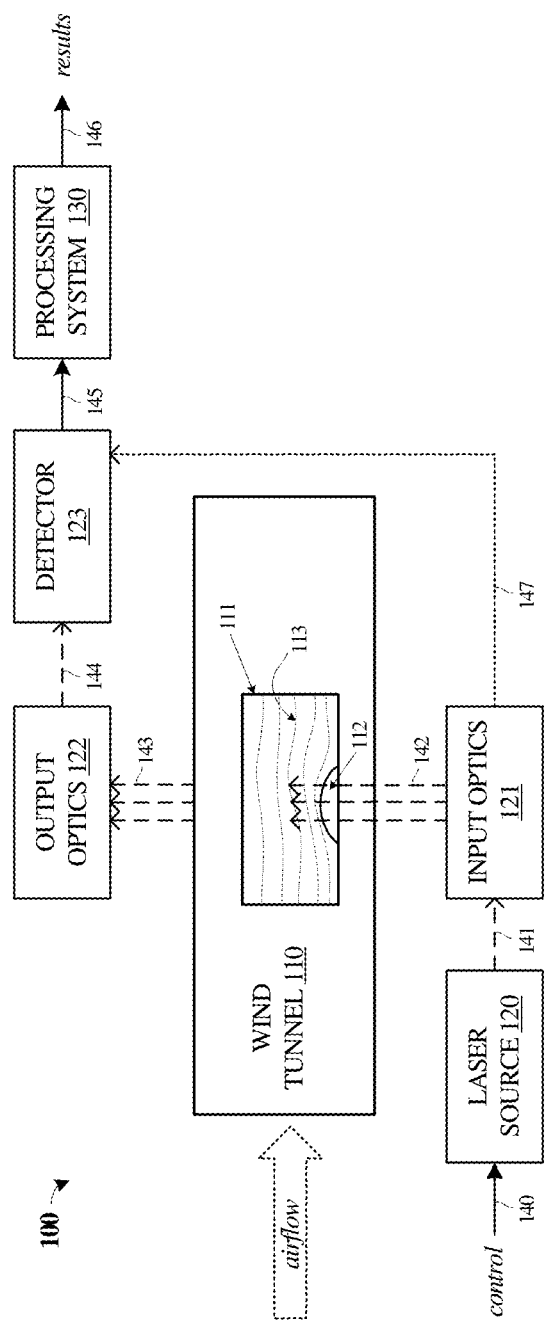
FIG. 1 illustrates an implementation of an operational environment for making path-resolved turbulence measurements.

The drawings have not necessarily been drawn to scale. Similarly, some components and/or operations may be separated into different blocks or combined into a single block for the purposes of discussion of some of the implementations of the present technology. Moreover, while the technology is amenable to various modifications and alternative forms, specific embodiments have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Wind tunnel experiments and testing can be used to characterize the aerodynamic performance of aeronautic parts modeled by test articles placed into an airflow. Single-beam Shack-Hartmann wavefront sensors are often used in wind tunnel measurements to measure aero-optical turbulence. In a typical test configuration, airflow is introduced through a wind tunnel and boundary layers naturally form along the walls of the wind tunnel. A test article is positioned within the wind tunnel, having associated boundary layer characteristics and other aerodynamic features. An optical beam is introduced into the wind tunnel to propagate through a portion of the airflow to characterize aerodynamic performance of the test article, as employed in a Shack-Hartmann wavefront sensor configuration.

Optical wavefront sensors such as Shack-Hartmann sensors measure path-integrated air density. Thus, the test configuration described above measures only combined wavefront errors of the test article and the wind tunnel side-wall boundary layer. This combined measurement can prevent detailed individual analysis of wavefront errors of the associated aeronautic parts modeled by the test article within the airflow of the wind tunnel. Specifically, the optical index of refraction of an air mass is proportional to air density. When a laser beam propagates through air, the optical wavefront is delayed by the integrated index variations along the beam propagation direction. As mentioned above, data from path-integrated measurements contains information from both the test article and turbulent airflow at the wind tunnel side-walls. Thus, it is desired to have localized measurements of the airflow around test articles.

Discussed herein are enhanced techniques and elements for measurement of turbulence and other aerodynamical effects of test articles that model various aeronautic parts in wind tunnels or in other measurement systems. These enhanced techniques can be referred to as digital holography (DH) tomography (DHT), and comprise digital holography and computed tomography that enable path-resolved turbulence measurements. This approach uses multiple beams for tomography that propagate at different angles and a digital holography wavefront sensor. The use of multi-beam tomographic measurements can isolate test article and boundary layer wavefront error contributions. Various systems and apparatuses generate multiple beams that propagate at different angles using a diffraction grating. Digital holographic recording enables simultaneous wavefront sensing and tomography measurements for multiple beams, instead of using several Shack-Hartmann wavefront sensors. Digital holography can be used to make simultaneous measurements for several beams with one sensor. Digital holography recording can be scaled for multiple-beam measurements, such as 25 beams or more.

Advantageously, isolated wavefront error measurements can be performed that allow detailed aero-optical analysis of aeronautic designs. For example, optical turrets mounted to aircraft for imaging and directed-energy beam projection systems can be tested and such aeronautic elements can be characterized for aerodynamical performance. Other applications include hypersonics and near-ground horizontal-path turbulence studies. While many of the examples herein discuss measurements related to test articles, measurement applications do not need to involve a test article, and instead can comprise tomographic measurements of naturally occurring atmospheric turbulence in outdoor settings for phenomenology studies.

Using multi-beam tomographic measurements permits tomographic reconstruction of the three-dimensional (3D) volume within a wind tunnel. This is analogous to computed tomography used for medical imaging where a scanner rotates 360 degrees around a subject. However, the resolution along the beam propagation direction is limited by the range of angles that can propagate through the wind tunnel (this is known as limited-angle tomography). A tomographic reconstruction will provide airflow data localized to the test article.

Digital holography refers to using a digital imaging sensor, such as a digital camera or focal plane array (FPA), to record interference between a complex optical field under test and a local oscillator or reference field. Interference with the reference field converts phase variations in the signal field into intensity variations that can be readily measured, as in interferometry. The recorded hologram can then be digitally processed or "replayed" to retrieve the complex signal field (amplitude and phase).

FIG. 1 illustrates operational environment 100 for making path-resolved turbulence measurements using DHT in an implementation. In operational environment 100, test article 112 is positioned in wind tunnel 110. As air flows through wind tunnel 110, airflow 113 generates turbulence over or around test article 112 as well as along the sidewalls and aperture 111 of wind tunnel 110. Airflow 113 in wind tunnel 110 gives rise to turbulent boundary layers along the sidewalls and aperture 111 of wind tunnel 110 and around test article 112. Test article 112 may include components of precision optical systems such as imaging or directed-energy beam projection systems for which turbulent airflow introduces refractive errors. Operational environment 100 isolates boundary layer wavefront error contributions localized to test article 112 from the error contributions of turbulent boundary layers along optical window 111 and other extraneous sources by resolving the turbulence measurements longitudinally.

In FIG. 1, laser source 120 generates and transmits laser beam 141 which is provided to input optics 121, from which several testing beams are derived. Specifically, input optics 121 produces a source beam (not shown) and reference beam 147. Input optics 121 includes an element to split or divide laser beam 141 into the source beam and reference beam 147. Input optics 121 also include a diffraction grating and, optionally, a beam expander. The diffraction grating diffracts the source beam into multiple test beams 142 which propagate at different angles from the diffraction grating, pass through entrance aperture 111 of wind tunnel 110, and then through airflow 113 where turbulence is to be measured. The portion of airflow 113 which is measured can include, for example, through the boundary layer over test article 112. Test beams 143 exit wind tunnel 110 where they are collected by output optics 122. Test beams 143 comprise test beams 142 after propagation through airflow 113 and out an associated exit aperture (not shown) in wind tunnel 110. Output optics 122 condition and project test beams 144 to detector 123.

Input optics 121 as well as output optics 122 may comprise various optically transmissive materials whose geometry alters a path or angle of a transiting optical signal. Example materials include borosilicate glass, fused silica, calcium fluoride, sapphire, and the like, which may include various dopants or impurities which alter transmission characteristics of the base materials. A diffraction grating may comprise a corrugated surface patterned onto the surface of a transmissive optical window, among other suitable types of phase gratings. Grating slits are typically spaced slightly larger than the laser beam wavelength. Wind tunnel 110 can comprise a transonic wind tunnel or various other wind tunnels with controllable wind speeds which provides a controlled environment for generating and visualizing turbulent airflow. Wind tunnel 110 typically includes a test volume with aperture 111 or various other optical windows with which flow visualization measurements can be made.

In an implementation, input optics 121 comprise a two-dimensional diffraction grating which configures test beams 142 in a two-dimensional array. For example, the source beam may be diffracted to produce test beams 142 configured in a 5×5 array of test beams. The two-dimensional array of test beams 142 is then used to create a three-dimensional tomographic reconstruction of turbulence through which test beams 142 pass. Optionally, input optics 121 further include a beam expander which increases the diameters of test beams 142 to ensure test article 112 and selected portions of airflow 113 are fully illuminated by test beams 142. After passing through wind tunnel 110, exiting test beams 143 are collected by output optics 122 which focuses and projects test beams 144 onto detector 123.

A reference beam is also employed in the measurements noted herein, and this reference beam does not propagate through airflow 113. In FIG. 1, concurrent with the projection and propagation of test beams 142 through input optics 121, wind tunnel 110, and output optics 122, reference beam 147 travels from input optics 121 to detector 123 where reference beam 147 is optically interfered with test beams 144 onto detector 123. The interference of reference beam 147 with multiple test beams 144 is recorded by detector 123 in a single holographic exposure. Reference beam 147 travels through an optical waveguide such as an optical fiber, the path length of which will be roughly equal to the path length of test beams 142, 143, and 144.

Detector 123 of FIG. 1 is a digital holographic sensor which detects and digitizes the optical interference of reference beam 147 with test beams 144 in a holographic exposure. This holographic exposure, after capture and digitization, is shown as holographic signal 145. Detector 123 can comprise various types of optical sensors, such as a charge-coupled device (CCD) sensor, complementary metal-oxide-semiconductor (CMOS) sensor, or some other electro-optical sensor. In some examples, detector 123 is slightly offset from the image plane of test beams 144. This offset causes the projection of test beams 144 to be slightly defocused at detector 123 to avoid pixel saturation. In an implementation, operational environment 100 comprises an off-axis digital holography recording geometry, meaning that reference beam 147 and test beams 144 are positioned with a small angle between them.

Processing system 130 processes holographic signal 145 transmitted from detector 123. When reference beam 147 and test beams 144 are concurrently projected onto detector 123, the interference converts wavefront phase variations in test beams 144 into intensity variations that can be recorded as holographic signal 145. Independent measurements of reference beam 147 and of test beams 144 are subtracted from holographic signal 145 leaving the interference pattern or hologram. These independent measurements can be made from separate recordings of reference beam 147 and test beams 144 before or after holographic signal 145 is recorded. This interference pattern or hologram is then digitally processed or numerically "replayed" by processing system 130 to retrieve the complex signal field (including amplitude and phase) of the hologram. Processing system 130 includes computing a 2D Fourier transform of the hologram which produces the total pupil field for each of test beams 144. With the off-axis recording geometry, the holographic image is recorded in an image plane rather than the pupil plane to spatially separate the interference pattern from each of the test beams 144. The detector is positioned to introduce slight defocusing in order to avoid pixel saturation. The Fourier transformation applied to the interference pattern yields a complex holographic image of the signal field in the pupil plane along with a holographic conjugate image. A binary mask is applied to isolate the holographic pupil image from the holographic twin, and then an inverse FFT is computed which replays test beams 144 to retrieve the signal field. In an implementation, digitally focusing the holographic signal includes, after calculating the FFT of the holographic signal, multiplying the data by a complex exponential with a quadratic focus phase term that corrects prior to calculating the inverse FFT.

After retrieving the signal field for each of test beams 144 from holographic signal 145, processing system 130 reconstructs and longitudinally resolves the turbulence volume 113 through which test beams 142 passed using computed tomography. Using the enhanced process of digital holography with computed tomography described herein, operational environment 100 yields path-resolved turbulence measurements of turbulence volume 113 by which turbulence localized to test article 112 can be isolated from turbulence generated by extraneous sources, such as walls of wind tunnel 110.

Figure 2:
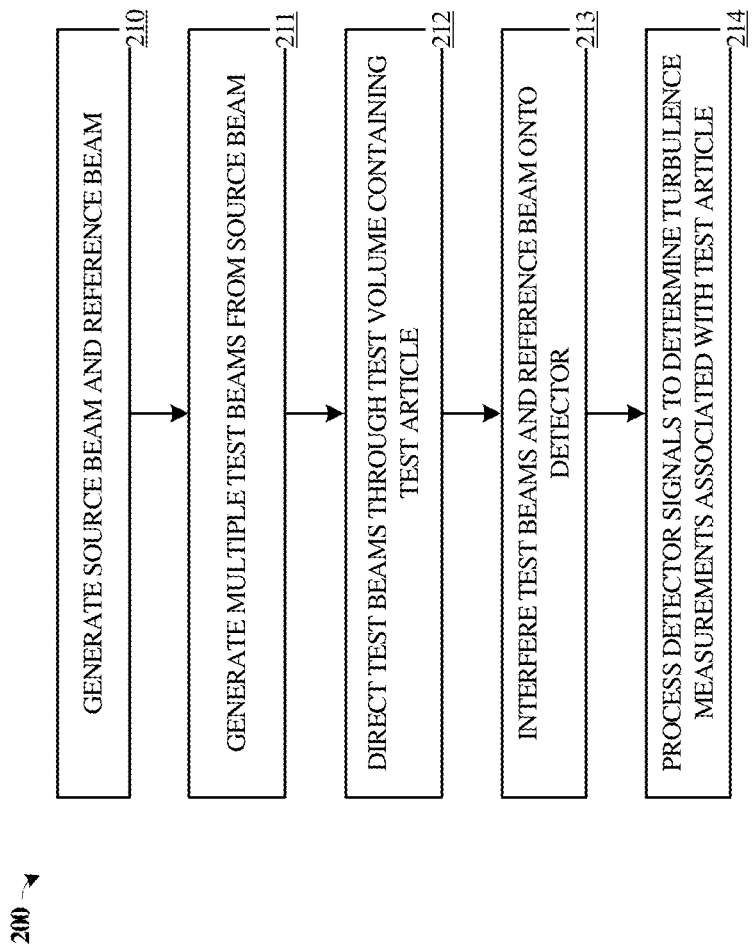
FIG. 2 illustrates an implementation for making path-resolved turbulence measurements.

FIG. 2 illustrates operations 200 for making path-resolved turbulence measurements using digital holographic tomography. The operations of FIG. 2 are discussed in the context of the elements of FIG. 1, although other elements discussed herein can instead be employed. In operation 210, laser source 120 generates and transmits laser beam 141 which is provided to input optics 121, which in turn produces a source beam (not shown) and reference beam 147. Next, input optics 121 diffract the source beam to produce multiple test beams 142 (operation 211). In an implementation of the technology, input optics 121 include a two-dimensional grating is used to configure the multiple test beams into a 2D array for 3D tomographic reconstruction of a turbulence volume. Test beams 142 propagate from the diffraction grating at different angles and enter wind tunnel 110 via aperture 111. It may be appreciated that in some instances, prior to entering wind tunnel 110, input optics 121 include a beam expander which broadens the cross-sectional area of test beams 142 to ensure test article 112 is fully illuminated.

Next, the test beams pass through wind tunnel 110 containing test article 112 (operation 212). Airflow through wind tunnel 110 generates turbulent boundary layers over test article 112 and along the sidewalls of wind tunnel 110. As test beams 142 transit the turbulent boundary layers, changes in air density of the turbulence introduce refractive errors in the wavefronts of test beams 142.

Upon exiting wind tunnel 110, the test beams are collected by output optics 122 and focused onto detector 123. As test beams 144 are projected onto detector 123, reference beam 147 is also projected onto detector 123 creating an interference pattern (operation 213). Detector 123 records the interference and transmits holographic signal 145 that is representative of the interference to processing system 130. Processing system 130 processes holographic signal 145, which includes extracting the signal field of test beams 142 and tomographically reconstructing the turbulence encoded in the intensity variations of the signal field (operation 214).

Figure 3:
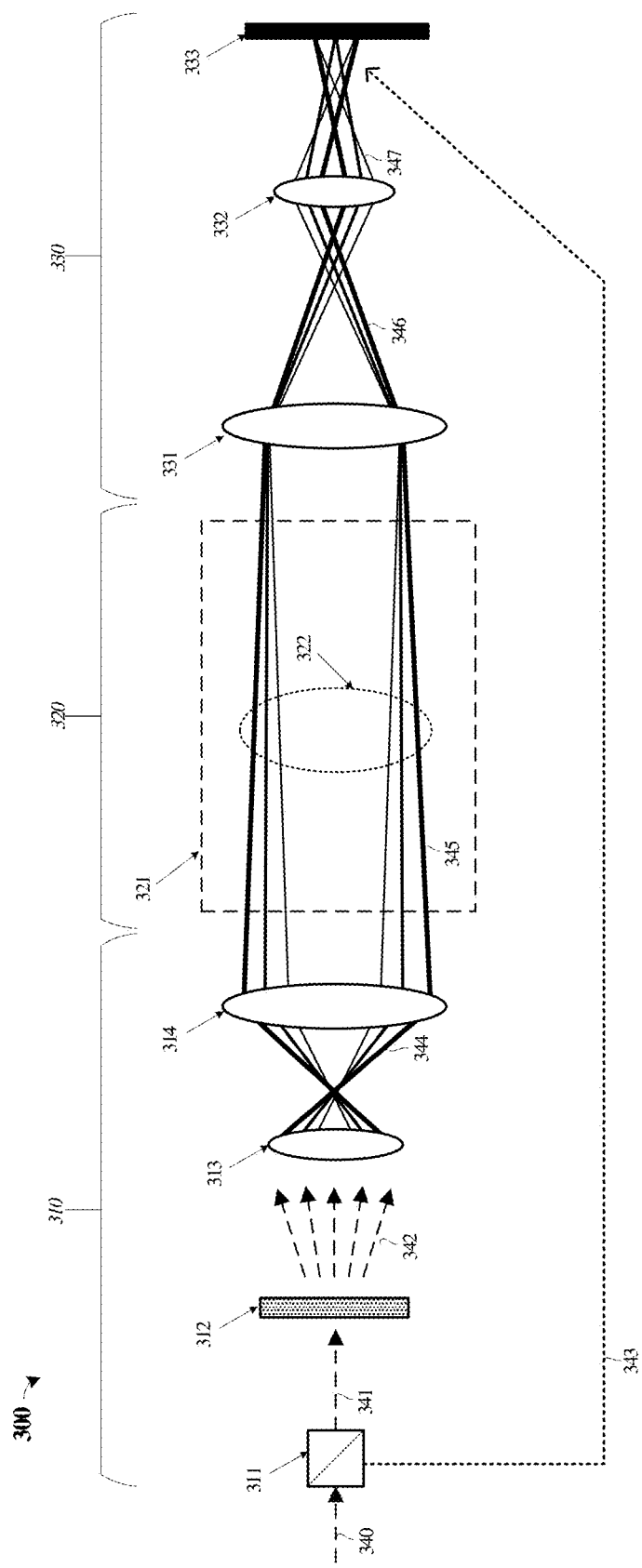
FIG. 3 illustrates an operational scenario of an implementation for making path-resolved turbulence measurements.

FIG. 3 details an enhanced technique for measuring path-resolved turbulence which combines digital holography and compute tomography principles. Test configuration 300 of FIG. 3 illustrates an implementation of a digital holographic tomography (DHT) setup for path-resolved turbulence measurements of test article 322 contained in test volume 321. Transmission portion 310 of test configuration 300 includes laser source 340, beam splitter 311, and various other optical elements which condition test beams 342 for propagation through test chamber 321. Receiver portion 330 includes various optical elements which collect and project exiting test beams 345 to detector 333, and detector 333. Test portion 320 includes test chamber 321 further containing test article 322. Test article 322 includes components of systems requiring localized measurements of turbulence or aberrated optical wavefronts of aerodynamic or aerospace components of directed energy systems, optical communications systems, imaging systems, and so on.

In test configuration 300, laser 340 passes through beam splitter 311 to generate source beam 341 and reference beam 343. Diffraction grating 312 is configured to generate the multiple test beams 342 from source beam 341. Input optic elements 313 and 314 broaden the cross-sectional extent of test beams 342, then direct test beams 345 through test volume 321. Output optic elements 331 and 332 are configured to collect and project test beams 345 exiting test volume 321 onto detector 333 for interference with reference beam 343. A processing system (not shown) is configured to process measurements made by detector 333 to determine path-resolved turbulence measurements of at least test article 322. Elements of FIG. 3 may use similar elements as FIG. 1 in an example, although variations are possible.

Diffraction grating 312 generates the multiple test beams 342 such that test beams 342 propagate at multiple projection angles through test volume 321 for tomographic reconstruction. Concurrent with the propagation of source beam 341 and test beams 342, 344, 345, 346, and 347, reference beam 343 propagates through an optical fiber conductor and exits the fiber tip at the exit plane of output optic element 332 to be projected onto detector 333. At detector 333, reference beam 343 interferes with test beams 347, creating an interference pattern recorded by detector 333.

In some examples, test configuration 300 in FIG. 3 comprises an off-axis image-plane digital holography recording geometry for recording a digital hologram. "Off-axis" refers to the fact that the reference beam and test beams are positioned with a small angle between them at the exit of the receiver plane. "Image-plane" refers to positioning the detector at an image plane (also known as a back focus plane) rather than at the pupil plane. Positioning detector 333 in a plane slightly away from the image plane results in defocusing the holograms which avoids pixel saturation of detector 333. Digital corrections for the defocusing are applied during signal processing.

Figure 4:
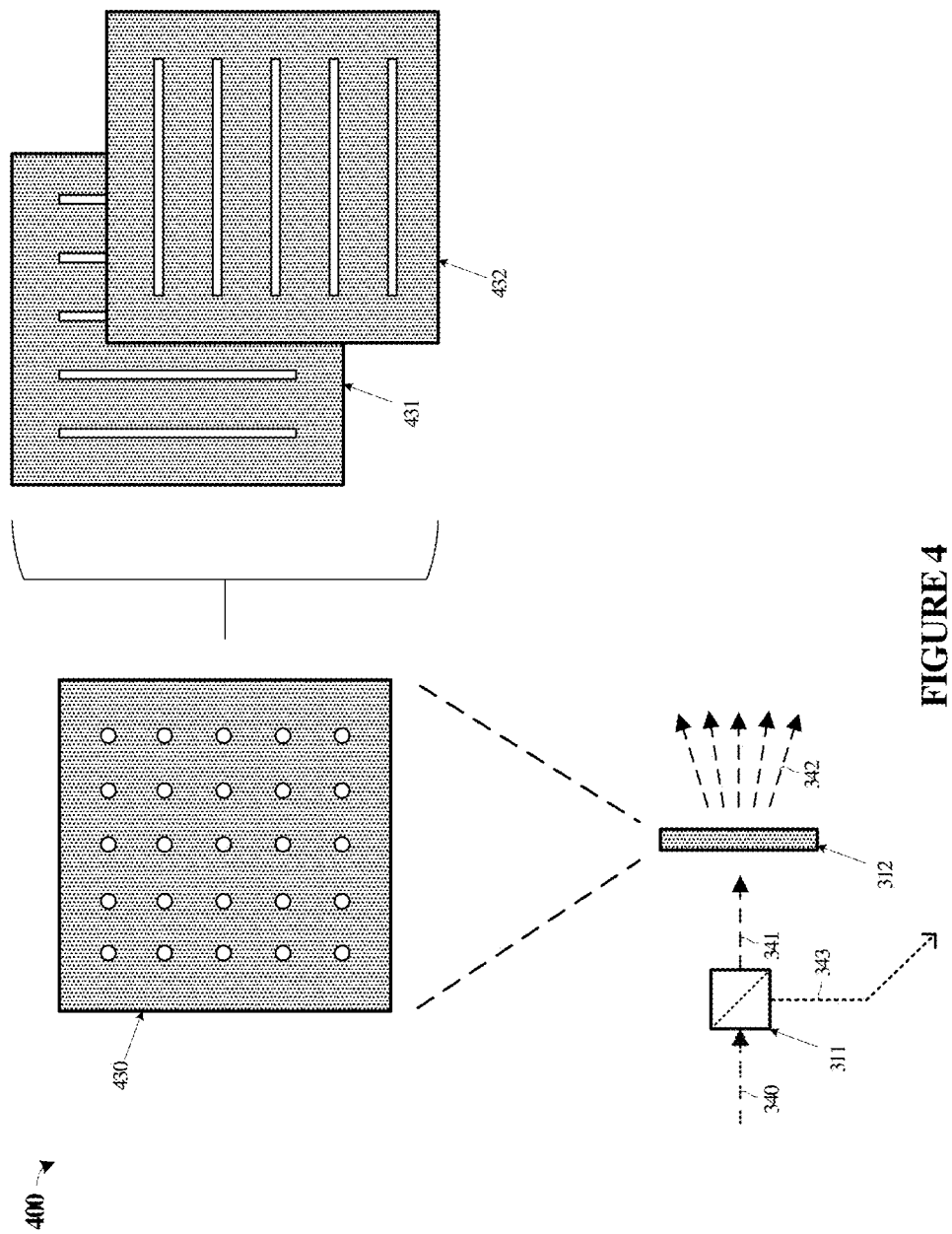
FIG. 4 illustrates a close-up view of a portion of an operational scenario for making path-resolved turbulence measurements.

FIG. 4 illustrates a close-up view of an implementation of diffraction grating 312 comprising diffraction gratings 431 and 432, each of which has five slits. Diffraction gratings 431 and 432 are positioned orthogonally to create a 5×5 array of grid openings as demonstrated in grid pattern 430. Diffraction grating 312 diffracts source beam 341 to create multiple beams with the transmitted energy of source beam 341 mostly concentrated in the central 5×5 array of beams, although further beams can be formed (and typically having less energy than the central array). The central 5×5 array of beams comprise test beams 342 which propagate from diffraction grating 312 at different angles. From diffraction grating 312, input optic elements (of which 313 and 314 in FIG. 3 are representative) transmit and condition the central beams as test beams 342 to produce the desired beam size before propagating through test volume 321.

Figure 5:
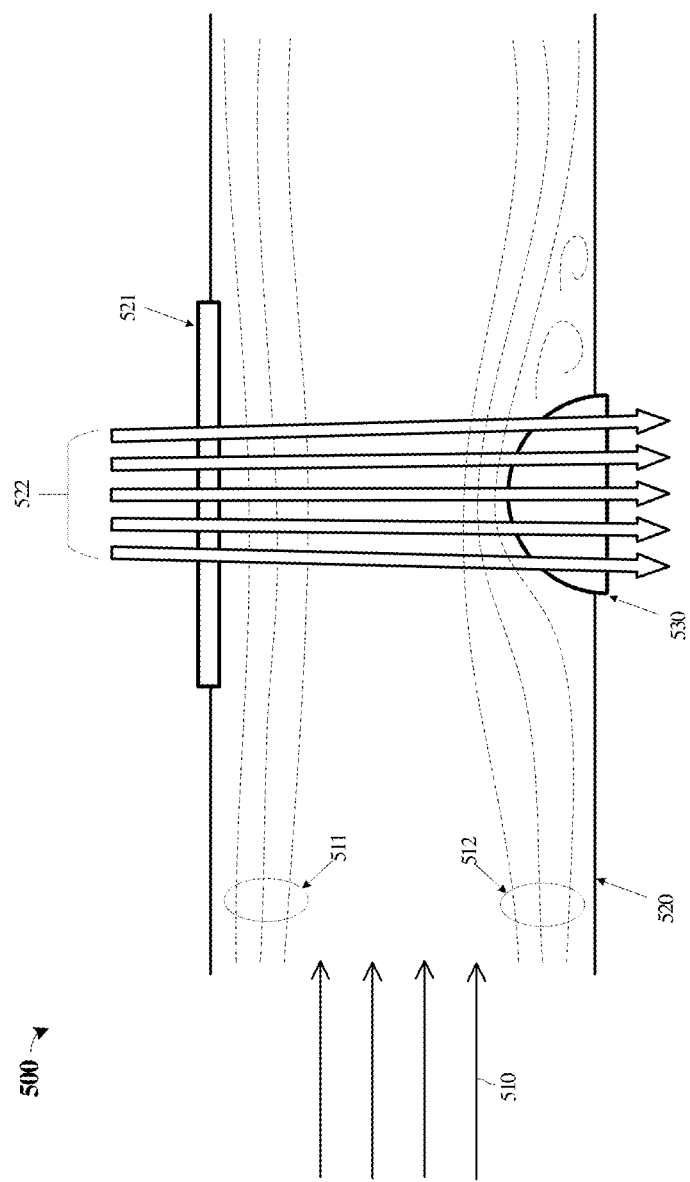
FIG. 5 illustrates an implementation to measure path-resolved turbulence of a test article in a wind tunnel.

FIG. 5 illustrates test configuration 500 for measuring turbulent airflow around test article 530 situated in a wind tunnel test chamber 520. In this exemplary implementation, test article 530 is an optical turret for which measurements of turbulent boundary layer 512 over test article 530 are to be quantified. As wind 510 travels through the wind tunnel giving rise to turbulent boundary layers 511 and 512, test beams 522 pass through optical window 521 where they pass through turbulent boundary layer 511 along the sidewall of test chamber 520, through turbulent boundary layer 512 over test article 530, and then exit test chamber 520. After exiting, test beams 522 pass through receiver or output optics, such as optic elements 331 and 332 of FIG. 3, and onto a detector such as detector 333 of FIG. 3. Elements of FIG. 5 may use similar elements as FIG. 1 in an example, although variations are possible.

At the detector, the optical wavefronts of test beams 522 are delayed by the integrated refractive index variations along their direction of travel. These integrated refractive index variations arise from and correspond to the variations in air density in turbulent boundary layers 511 and 512. In order to obtain the desired localized turbulence measurements corresponding to turbulent boundary layer 511, tomographic techniques are applied to test beams 522 which will yield path-resolved turbulence measurements from which the localized turbulence on test article 530 can be measured.

Figure 6:
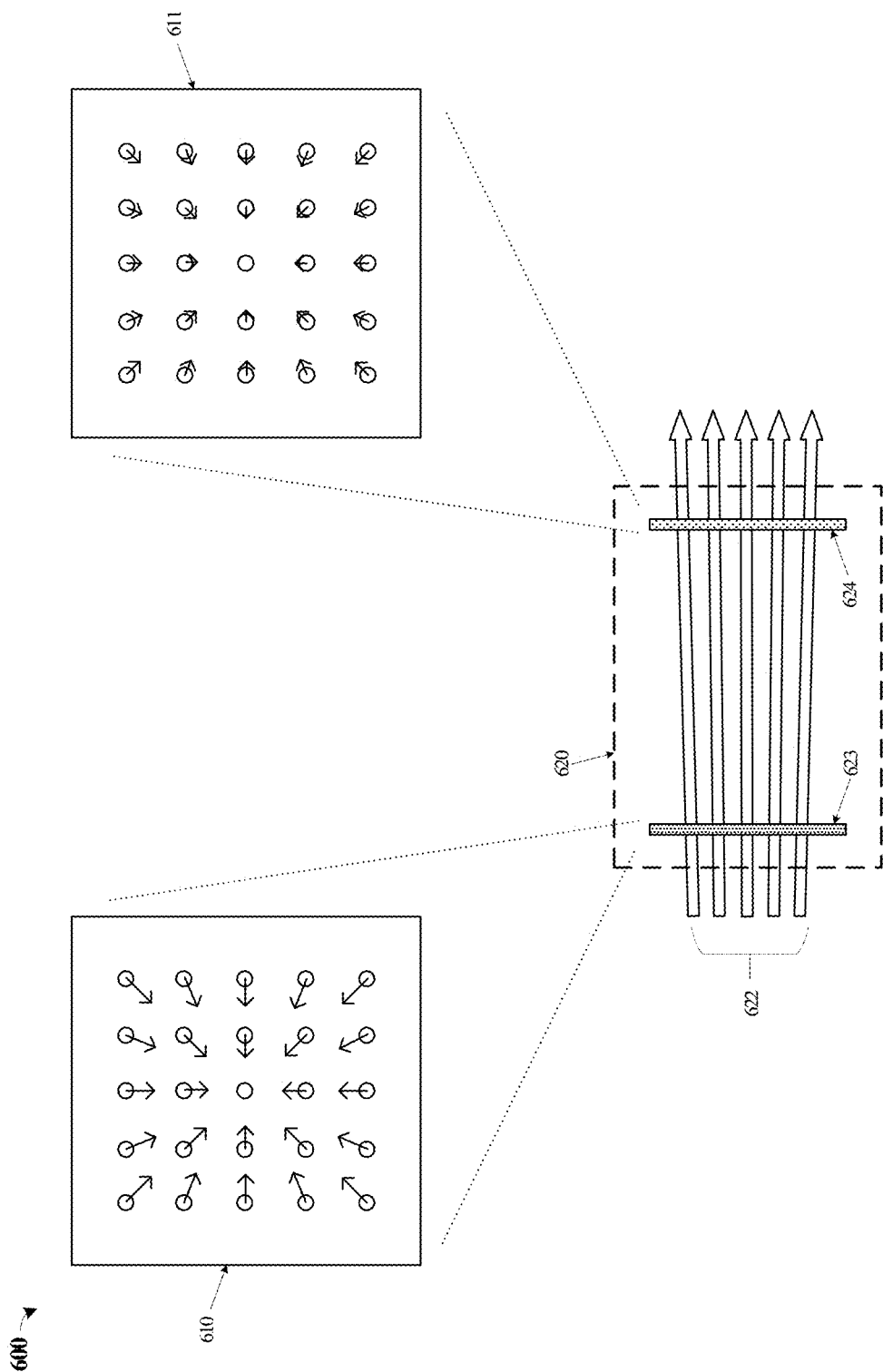
FIG. 6 illustrates an implementation to measure prescriptions of sequentially positioned plates.

To validate or calibrate a test setup for measuring turbulent airflow using the enhanced techniques of combining digital holography with computed tomography, multiple static phase screens with known prescriptions simulate a turbulence volume, an implementation of which is illustrated in FIG. 6. Test volume 620 is positioned in a test configuration such as test configuration 300 of FIG. 3 and in place of test volume 321. Test volume 620 holds phase plates 623 and 624 with known optical prescriptions.

In test configuration 600 of FIG. 6, prior to entering test volume 620, a diffraction grating is positioned in a signal path of a source laser beam which splits the source beam into a 5×5 array of test beams 622. Test beams 622 are then conditioned with transmitter or input optics to produce desired beam size before propagating through test volume 620 at different angles. In an implementation, test beams 622 enter test volume 620 with beam diameters of approximately 20 mm and with a relative propagation angle of 1.5 milliradians between adjacent diffraction orders.

Having exited the input optics, test beams 622 pass through phase plates 623 and 624. Optical phase plates introduce phase distortions in optical beams which mimic the effect of passing optical beams through a turbulence volume. Thus, the validity of the test configuration can be confirmed by measuring the phase distortions introduced by phase plates 623 and 624 and comparing the results to their known prescriptions.

After propagation through test volume 620, the array of test beams 622 is then collected by relay or output optics, focused onto a digital holography sensor, and interfered with by a reference beam. The reference beam is sourced from a beam splitter that splits a single laser beam into a first and second portion, the first portion comprising the source laser beam (discussed above) and the second portion employed as the reference beam. The reference beam travels along an optical fiber to the digital holography sensor, of which detector 333 of FIG. 3 is representative. Test beams 622 and the reference beam are simultaneously captured on the single digital holography sensor which records the interference of the reference beam with test beams 622 simultaneously and in a single measurement.

Several measurements may be taken to validate a test setup. A first measurement comprises recorded data with no phase plates for system calibration. A second measurement comprises recorded data with individual phase plates as control measurements. A third measurement comprises recorded data with both phase plates for tomographic reconstruction. System calibration includes quantifying system wavefront error and quantifying beam shear values of the test beams. To quantify system wavefront error, the signal field of the test beams for the as-built test setup (i.e., unperturbed by an aberrating medium) is recorded. Quantifying wavefront error for each test beam includes identifying the nominal beam position of each test beam and maximizing the sharpness of the test beam image. The nominal beam position of each test beam can be identified based on the location of its image-plane peak intensity. Image sharpness of each test beam is maximized by running a sharpness algorithm which comprises iteratively solving for Zernike polynomial wavefront correction coefficients. System wavefront error can then be removed from experimental wavefront data during signal processing. Quantifying the test beam shear values is discussed below with FIG. 6.

Also shown in FIG. 6 are beam shear patterns 610 and 612 in the planes of phase plates 623 and 624, respectively. Each of the beams in the 5×5 array has a shear with respect to the centermost beam indicated by the arrows (except for the centermost beam which has no shear by definition). The shear values reflect the angle of propagation through test volume 620 of the corresponding beam. The shear values are a function of the diffraction grating but also reflect irregularities due to optical distortions in the experimental setup. Beam shear values are determined by comparing wavefront measurements of each of the 24 beams around the centermost beam with the undeflected centermost beam. Shear values can be determined by cross-correlating the wavefront measurement for each beam with the wavefront measurement for the undeflected beam and locating the cross-correlation peak. This comparison can be made using test beam wavefront image data recorded using a single phase plate in the test volume before or after recording experimental wavefront data. Beam shear patterns will vary with the longitudinal position of the phase plate in the test setup, thus enabling path-resolved turbulence measurements in the tomographic reconstruction.

Figure 7:
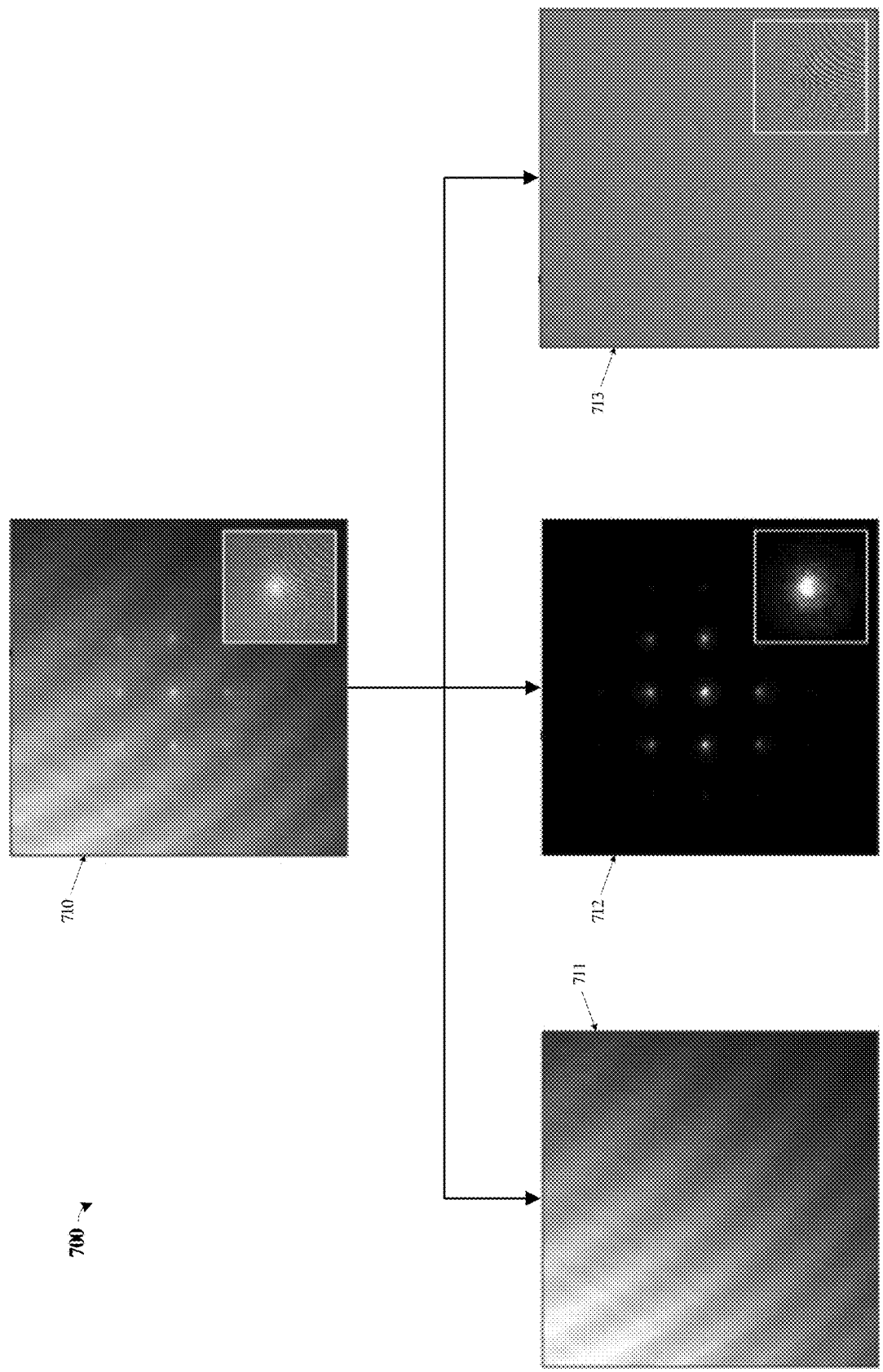
FIG. 7 illustrates a raw hologram decomposed into a reference beam, signal beams, and remainder interference fringes.

FIG. 7 shows exemplary images of results obtained from an implementation of the test setup illustrated in FIG. 6 together with FIG. 3. The images were obtained at various stages of the DHT signal processing performed by a computer receiving interference signals from a digital holographic sensor, of which detector 333 in FIG. 3 is representative.

Exemplary image 710 is a "raw" digital hologram resulting from the simultaneous holographic recording of all 25 beams from a 5×5 test beam array, comprising 25 simultaneous individual holograms. Exemplary images 711 and 712 are measurements of the reference beam and the test beams, respectively, with no phase plates installed. The grid pattern visible in exemplary image 712 corresponds to the 5×5 test beam array. The variation in intensity between beams is due to the diffraction grating having unequal diffraction efficiency into all orders. The middle nine test beams are most visible; these beams are produced by the −1, 0, and +1 diffraction orders from the diffraction grating. The outer 16 beams with −2 and +2 diffraction orders are difficult to see because the diffraction efficiency for those beams was much lower than for the middle nine test beams. When exemplary images 711 and 712 are subtracted from exemplary image 710, the result is exemplary image 713.

The inset images on exemplary images 710, 712, and 713 show a magnified region around the centermost beam in the 5×5 test beam array. The inset of exemplary image 713 shows hologram fringes which are oriented diagonally in accordance with the diagonal off-axis positioning of the reference beam relative to the test beams.

Figure 8:
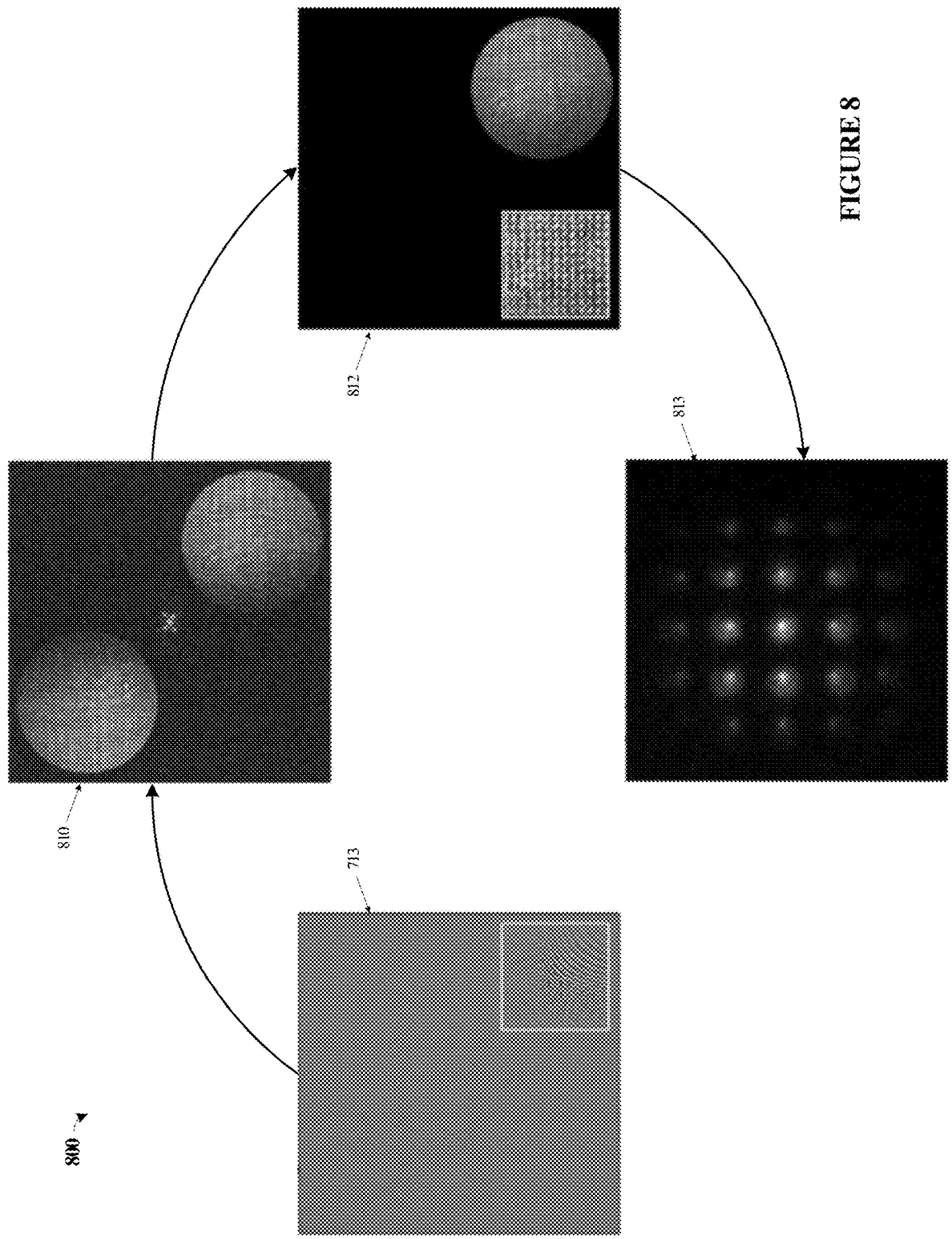
FIG. 8 illustrates an interference fringe pattern at stages of processing.

FIG. 8 continues with exemplary image 713, to which a Fast Fourier transform (FFT) is applied resulting in exemplary image 810. Because the holograms were recorded in an image plane (that is, defocused), the FFT yields a holographic image of the signal optical field in the pupil plane of the optical setup. The holographic image of the pupil appears in the lower right quadrant of the FFT array, while a holographic twin image appears in the upper left quadrant.

The hologram replay process concludes by multiplying the FFT array with a binary pupil mask to isolate the off-axis holographic pupil image (shown in exemplary image 812) and computing the inverse FFT, resulting in exemplary image 813. Each of the 25 beams is isolated during hologram replay to obtain the pupil field from the associated beam. Exemplary image 813 shows the replay of the 25 signal beams. After the wavefronts of each of the test beams have been isolated, longitudinal wavefront phase resolution (of phase plates in a test volume or of turbulent airflow over a test article) can be measured using computed tomographic reconstruction.

The process of replaying the holographic signal of each test beam includes beam demultiplexing, wherein the signal field of each test beam is isolated during signal processing. First, the pupil-plane wavefront calibration results for a desired test beam are applied to the replayed signal field (containing data for all beams). Wavefront calibration mitigates excess blurring in the image plane of the test beam and helps concentrate the desired signal beam to a smaller patch of pixels. Next, the desired test beam is isolated by multiplying the data array with a window function. Last, the isolated test beam is propagated back to the pupil plane using an FFT. This process is repeated for all test beams.

After test beam demultiplexing, wavefront phase data is unwrapped. As will be appreciated by those skilled of the art, there are a number of phase unwrapping procedures available. In an exemplary procedure, branchpoints are identified by path-integrating the modulo-$2\pi$ phase differences between neighboring samples for every 2×2 pixel neighborhood within the pupil region of an isolated test beam. Branch points are detected wherever the path integral is nonzero and identified as either having a ±1 residue if the path integral equals ±$2\pi$, respectively. Branch cuts are placed sequentially, starting with the branch points in the central region of the pupil and working outwards toward the edges. For each branch point, the shortest possible linear cut is placed either to the closest available branch point with an opposite residue or to the closet pupil boundary point.

Computed tomography (CT) refers to the reconstruction of an N-dimensional space from the measurement of multiple (N−1)-dimensional projections through that space. This technique is frequently used in medical imaging, where 3D CT scans are created by rotating an X-ray source and detector around a subject and capturing two-dimensional X-ray projection images at many different angles. Any of several reconstruction algorithms can then be applied to process the series of projections and create a 3D reconstruction of the subject.

Figure 9:
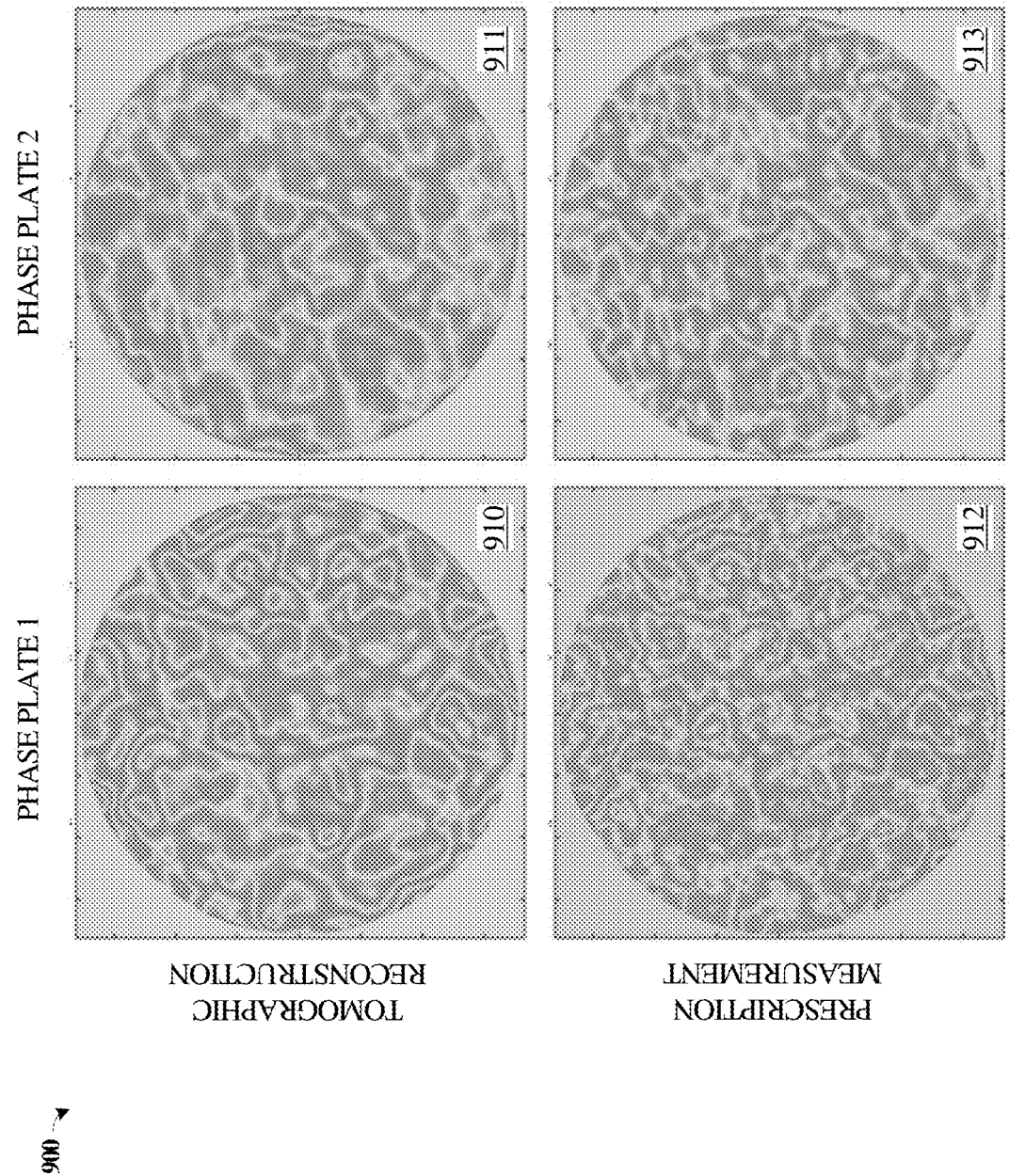
FIG. 9 illustrates tomographic reconstructions and prescription measurements of two phase plates.

Turning to FIG. 9, in an exemplary implementation of the technology, the optical prescriptions of two phase plates have been tomographically reconstructed. The individual prescriptions of phase plates 1 and 2, of which phase plates 623 and 624 of FIG. 6 are representative, were calculated from the 25 test beam projections through the test volume, together with the beam shear values. The beam shear values, of which beam shear patterns 610 and 612 of FIG. 6 are representative, are predetermined and are a function of the longitudinal position of the plates, the beam propagation angles, and any irregularities arising from optical distortions in the test setup. A comparison of the tomographic reconstructions with the known prescriptions of each of two phase screens is provided in FIG. 9. Exemplary images 910 and 911 are the tomographic reconstructions of phase plates 1 and 2, respectively. Exemplary images 912 and 913 are the respective plate prescription measurements. The tomographic reconstructions show excellent agreement with phase plate prescriptions. Thus, results from measurement by a digital hologram sensor produces a tomographic reconstruction that agrees with individual phase plate measurements. Reconstruction may exhibit low-order missing cone artifacts associated with limited angle tomography (wavefront phase maps are high-pass filtered).

The quality of tomographic reconstruction benefits from a large number of projections over a wide range of angles, producing better resolution and fewer reconstruction artifacts. Accordingly, the longitudinal resolution along the beam path achievable with this enhanced DHT measurement approach is determined by the maximum beam angle. However, Nyquist sampling of the angular space should be maintained to avoid ambiguities in the reconstruction from aliasing, and so it is not sufficient to simply have a few beams propagating at large angles through the volume. Assuming an appropriate angular sampling rate is maintained as maximum angle increases, the longitudinal resolution is then ultimately limited by the number of beams that can be simultaneously captured on the receiver FPA.

Figure 10:
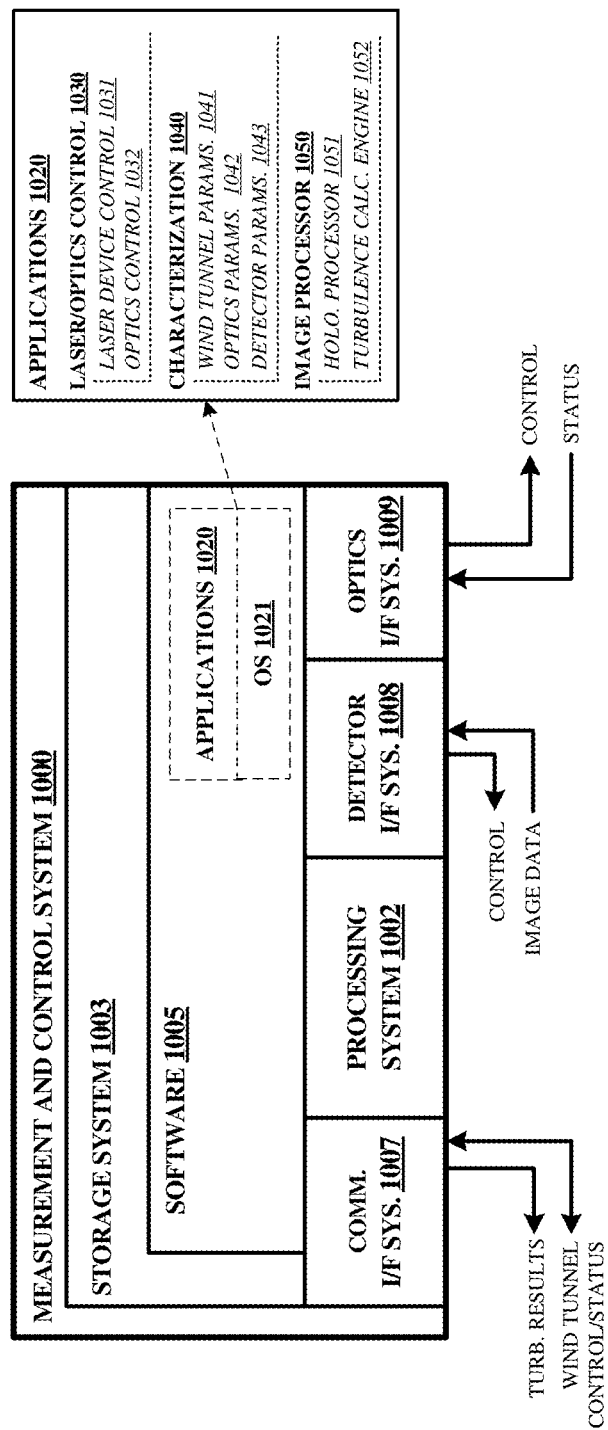
FIG. 10 illustrates a computing system suitable for implementing the various operational environments, architectures, processes, scenarios, and sequences discussed below with respect to the other Figures.

FIG. 10 illustrates measurement and control system 1000 and associated software 1005 in an implementation. Measurement and control system 1000 is representative of any system or collection of systems in which the various operational techniques, algorithms, architectures, scenarios, and processes disclosed herein may be implemented. For example, measurement and control system 1000 can be used to implement elements of processing system 130 of FIG. 1, the holographic processing operation which extracts the signal field of the test beams (of which exemplary image 813 in FIG. 8 is representative), or the tomographic reconstruction operation (of which exemplary images 910 and 911 in FIG. 9 are representative). Measurement and control system 1000 can implement one or more portions of the operations found in FIG. 2.

Measurement and control system 1000 may be implemented as a single apparatus, system, or device or may be implemented in a distributed manner as multiple apparatuses, systems, or devices. Measurement and control system 1000 includes, but is not limited to, processing system 1002, storage system 1003, software 1005, communication interface system 1007, detector interface system 1008, and optics interface system 1009. Processing system 1002 is operatively coupled with storage system 1003, communication interface system 1007, detector interface system 1008, and optics interface system 1009.

Processing system 1002 loads and executes software 1005 from storage system 1003. Software 1005 includes applications 1020, at least some of which are representative of the operational techniques, algorithms, architectures, scenarios, and processes discussed with respect to the included Figures. When executed by processing system 1002 to collect interference fringe images, process the interference fringe images in a frequency domain representation to digitally focus the holographic images, and tomographically reconstruct images from the replayed holographic images, among other services, software 1005 directs processing system 1002 to operate as described herein for at least the various processes, operational scenarios, and sequences discussed in the foregoing implementations. Measurement and control system 1000 may optionally include additional devices, features, or functionality not discussed for purposes of brevity.

Processing system 1002 may comprise a microprocessor and processing circuitry that retrieves and executes software 1005 from storage system 1003. Processing system 1002 may be implemented within a single processing device but may also be distributed across multiple processing devices or sub-systems that cooperate in executing program instructions. Examples of processing system 1002 include general purpose central processing units, application specific processors, graphics processing units, and logic devices, as well as any other type of processing device and supporting circuitry, combinations, or variations thereof.

Storage system 1003 may comprise any tangible computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 1003 may also include computer readable communication media over which at least some of software 1005 may be communicated internally or externally. Storage system 1003 may be implemented as a single storage device but may also be implemented across multiple storage devices or sub-systems co-located or distributed relative to each other. Storage system 1003 may comprise additional elements, such as a controller, capable of communicating with processing system 1002 or possibly other systems.

Software 1005 may be implemented in program instructions and among other functions may, when executed by processing system 1002, direct processing system 1002 to operate as described with respect to the various operational scenarios, sequences, and processes illustrated herein. For example, software 1005 may include program instructions comprising applications 1020 and operating system 1021 that provide control of a turbulence measuring system employing digital holography and computed tomography, among other services. In particular, the program instructions may include various components or modules that cooperate or otherwise interact to carry out the various processes and operational scenarios described herein. The various components or modules may be implemented in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software or other application software, in addition to or that include applications 1020. Software 1005 may also comprise firmware or some other form of machine-readable processing instructions executable by processing system 1002.

Software 1005, when loaded into processing system 1002 and executed, may transform a suitable apparatus, system, or device (of which measurement and control system 1000 is representative) overall from a general-purpose computing system into a special-purpose computing system customized to collect holographic signals of interference between test beams and a reference beam, process the holographic signals to extract signal fields of the test beams, calculate a tomographic reconstruction of the sources of phase distortion of the test beams captured in the signal fields, and correct for defocusing and for irregularities arising from optical distortions in the experimental setup, among other services. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors. For example, if the computer-readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 1020 can include laser/optics control 1030, characterization 1040, and image processor 1050. Laser/optics control 1030 includes laser device control 1031 and optics control 1032. Characterization 1040 includes wind tunnel parameters 1041, optics parameters 1042, and detector parameters 1043. Image processor 1050 includes holographic processor 1051 and turbulence calculation engine 1052.

Turning first to laser/optics control 1030, laser device control 1031 controls and interfaces with one or more laser(s) by which turbulent flow is measured. Operation of laser/optics control 1031 can be synchronized with a digital holographic sensor to capture interference patterns from which wavefront phase and amplitude distortions can be measured. Laser/optics control 1031 can also control any supporting circuitry or analog-to-digital circuitry associated with the lasers. Optics control 1032 provides control of the various optical transmission and collection devices, which may include controlling orientation, pointing, tilt, motor elements, gyroscopic elements, lens/mirror elements, light sensing elements, pointing assistance elements, or other elements associated with optical collection devices.

Turning next to characterization 1040, wind tunnel parameters 1041 capture physical and operational parameters of the wind tunnel and its components, such as wind tunnel operating status, wind speed, aperture characteristics, and the like. Optics parameters 1042 include physical and operational parameters of input and output optical elements, including beam splitters, diffraction gratings, beam expanders, lens, and so on, as well as optical parameters of any apertures of the test chamber. Optics parameters 1042 also include optical aberrations arising from the test setup. Detector parameters 1043 include physical and operational parameters of the optical sensor which records the interference pattern created when a reference beam interferes with one or more test beams.

Turning now to image processor 1050, holographic processor 1051 extracts from the "raw" holographic image captured by a digital holographic sensor the complex signal field of the test beams, which is then processed and replayed for tomographic reconstruction. Holographic processor 1051 employs various computational techniques that use interference data captured by the digital holographic sensor to reproduce the signal field of the test beams. Holographic processor 1051 subtracts reference and signal beam recordings or measurements from the "raw" holographic image, then transforms or otherwise converts the resulting holographic fringe data (i.e., complex-valued phase and amplitude data) into a frequency domain representation. The transformation can include a Fourier transform, Fast Fourier Transform (FFT), as well as pre-transform processing or post-transform processing. From the frequency domain representation, the holographic pupil plane image is isolated and an inverse FFT of the holographic pupil plane image is computed to produce a replay of the signal field of the test beams, thus correcting for any defocusing of the test beam projection on the digital holographic sensor. Turbulence calculation engine 1052 calculates a tomographic reconstruction of the turbulence volume from the signal fields captured in the digital hologram replay outputted from holographic processor 1051. Tomographic reconstruction can produce a path-resolved image of the air density variations (or phase plate distortions mimicking air density variations) that introduce wavefront errors of the transmitting test beams. In applying computed tomographic techniques, turbulence calculation engine 1052 algebraically reconstructs the turbulence volume in a plane at a longitudinal position within the volume from the two-dimensional data captured by the refractive distortions of the test beams, using beam shear values derived in part from the test beam propagation angles at the desired longitudinal position.

Communication interface system 1007 may include communication connections and devices that allow for communication with other imaging systems, computing systems, or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 1007 can receive configuration data or commands or receive interference data for detector interface 1008, and provide user commands, optics control, and imaging sensor device control for users or other operators. Communication interface system 1007 may provide portions of detector interface system 1008 or optics interface system 1009, such as physical link layer portions or other communication layer elements.

Detector interface system 1008 comprises various hardware and software elements for interfacing with imaging sensors or imaging devices that incorporate imaging sensors, such as digital holographic sensors, CCD cameras, CMOS sensors, and the like. The imaging sensors produce an interference pattern created by interfering one or more signal laser beams with a reference laser beam. Optics interface system 1009 comprises various hardware and software elements for interfacing with input and output optical elements, including control systems. Detector interface system 1008 and optics interface system 1009 may include various power supply or power control links.

Communication between measurement and control system 1000 and other elements or systems (not shown) via any of communication interface system 1007, detector interface system 1008, or optics interface system 1009, may occur over data links, control links, communication links, or communication networks and in accordance with various communication protocols, combinations of protocols, or variations thereof. For example, measurement and control system 1000, when implementing a control device, might communicate with laser sources, optical elements, detectors, or wind tunnel control hardware over corresponding digital communication links comprising Ethernet interfaces, serial interfaces, serial peripheral interface (SPI) links, inter-integrated circuit (I2C) interfaces, universal serial bus (USB) interfaces, universal asynchronous receiver-transmitter (UART) interfaces, or wireless interfaces. When network links are employed, example network topologies include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet Protocol (IP), the transmission control protocol (TCP), and the user datagram protocol (UDP), as well as any other suitable communication protocol, variation, or combination thereof.

Communication interface system 1007 may include a software or virtual interface such as a terminal interface, command line interface, or application programming interface (API). Communication interface system 1007 may also include physical user interfaces, such as keyboard, a mouse, a voice input device, or a touchscreen input device for receiving input from a user. Communication interface system 1007 may include visualization/status interfaces, user command controls, and telemetry, such as user controls, start/stop controls, operating mode control interfaces, visualization interfaces, and system characteristic calibration controls, among others. Output devices such as displays, speakers, web interfaces, terminal interfaces, and other types of output devices may also be included in communication interface system 1007. In network interface examples, communication interface system 1007 might packetize data for receipt by a display system or computing system coupled over one or more network interfaces. Communication interface system 1007 may comprise API elements for interfacing with users, other data systems, other user devices, web interfaces, and the like. Communication interface system 1007 may also include associated user interface software executable by processing system 1002 in support of the various user input and output devices discussed above. Separately or in conjunction with each other and other hardware and software elements, the user interface software and user interface devices may support a console user interface, graphical user interface, a natural user interface, or any other type of user interface.

It may be appreciated that, while the concepts disclosed herein are discussed in the context of turbulent airflow and phase plate prescription measurements, they apply as well to other contexts. Likewise, the concepts apply not just to wind tunnel test configurations, but to other test or experimental locations and setups.

A potential application of digital holographic tomography is the measurement of atmospheric turbulence along horizontal beam paths. This is of interest for some directed energy engagements, ground-to-ground targeting systems, as well as terrestrial lasercom links. For outdoor, long-path measurements, the diffraction-grating based transmitter could be replaced with an array of optical fiber tips.

Another potential application is DHT atmospheric turbulence characterization. A portable DH/LIDAR system can be leveraged to perform field experiments with DHT measurement equipment. Field experiments can be performed side-by-side with computational fluid dynamics simulations or other atmospheric turbulence characterization systems to confirm or complement DHT results. It should be noted that DHT would measure individual turbulence realizations, while these other atmospheric turbulence characterization systems characterize turbulence statistical parameters to provide complementary information.

As mentioned herein, characterization of aerospace components in wind tunnels is frequently aided by an optical diagnostic measuring optical wavefront distortion created by the turbulent flow across the component under test. This is usually performed with a single beam and a Shack-Hartmann wavefront sensor, but the measured wavefront obtained from a single beam/projection includes distortions introduced by boundary layer effects along the wind tunnel walls, preventing detailed analysis of just the component disturbances. A similar measurement problem to wind tunnels exists in astronomy or remote imaging/sensing, where observations are corrupted by near-ground and upper-atmosphere turbulence. The enhanced DHT techniques discussed herein can overcome limitations of using a single beam and a Shack-Hartmann wavefront sensor and isolate the wavefront errors from just the test component.

A wind tunnel can characterize an aerospace test article positioned with an airflow produced in the wind tunnel. Testing can be conducted at a range of look angles through or across the test article and under a variety of wind tunnel conditions. Within the three-dimensional test chamber within the wind tunnel, in a turbulence volume, the test article, side-wall, and various other boundary layers can be isolated through tomographic reconstruction in post-processing.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:
   generating a source optical beam and a reference optical beam;
   diffracting the source optical beam to produce multiple test beams;
   directing the multiple test beams through a test volume housing a test article such that the multiple test beams propagate at different angles through the test volume;
   interfering the multiple test beams and the reference optical beam onto a detector such that at least the multiple test beams are defocused on the detector and a pixel saturation of the detector is avoided; and
   processing one or more signals produced by the detector to determine turbulence measurements associated with at least the test article.

2. The method of claim 1, further comprising:
   diffracting the source optical beam with a diffraction grating positioned before the test volume to generate the multiple test beams.

3. The method of claim 1, further comprising:
   obtaining at least an indication of an undeflected test beam determined during a calibration operation for a test volume having no test article; and
   processing the indications of the different angles relative to at least the indication of the undeflected test beam to determine the path-resolved turbulence measurements.

4. The method of claim 1, further comprising:
   forming the source optical beam and the reference optical beam by at least passing a common laser beam through a beam splitter.

5. The method of claim 1, further comprising:
   positioning the detector offset from an image plane of the multiple test beams to reduce the pixel saturation of detector.

6. The method of claim 1, further comprising:
   diffracting the source optical beam such that the multiple test beams comprise a two-dimensional diffraction pattern.

7. The method of claim 1, further comprising:
   broadening the cross-sectional extent of the multiple test beams prior to directing the multiple test beams through the test volume.

8. An apparatus, comprising:
   a laser system that generates a source beam and a reference beam;
   a diffraction grating configured to generate multiple test beams from the source beam;
   input optic elements configured to direct the multiple test beams through a test volume containing a test article such that the multiple test beams propagate at different angles through the test volume;
   output optic elements configured to project the multiple test beams onto a detector for interference with the reference beam such that at least the multiple test beams are defocused on the detector and a pixel saturation of the detector is avoided; and
   the detector configured to provide a digital representation of the interference to a processing system for measuring turbulence associated with at least the test article.

9. The apparatus of claim 8, further comprising:
   the processing system configured to process the digital representation provided by the detector and determine an indication of turbulence of at least the test article.

10. The apparatus of claim 9, wherein processing the digital representation provided by the detector comprises isolating amplitude and phase information of the multiple test beams and calculating a tomographic reconstruction of turbulence of at least the test volume based on at least the amplitude and phase information of the multiple test beams.

11. The apparatus of claim 9, wherein processing the digital representation provided by the detector further comprises obtaining at least an indication of an undeflected test beam determined during a calibration operation for a test volume having no test article and processing the indications of the different angles relative to at least the indication of the undeflected test beam to determine the path-resolved turbulence measurements.

12. The apparatus of claim 8, wherein the diffraction grating is positioned before the test volume and generates the multiple test beams.

13. The apparatus of claim 8, wherein the laser system comprises a beam splitter that generates the source beam and the reference beam from a laser beam.

14. The apparatus of claim 8, wherein the diffraction grating comprises a two-dimensional grating pattern.

15. The apparatus of claim 8, wherein the input optics comprise a beam expander to alter a cross-sectional extent of the multiple test beams prior to entering the test volume.

16. The apparatus of claim 8, wherein the output optics are configured to position the detector offset from an image plane of the multiple test beams to reduce the pixel saturation of the detector.

17. An apparatus, comprising:
program instructions stored on one or more non-transitory computer readable storage media, the program instructions executable by a processing system to direct the processing system to at least:
receive a digital representation of an interference pattern obtained by an optical detector and generated by at least interfering a reference beam with multiple test beams that propagate at different angles through a test volume containing a test article such that a pixel saturation of the optical detector is avoided by at least having the multiple test beams defocused as projected on the detector;
process the digital representation and indications obtained of the different angles to determine path-resolved turbulence measurements; and
provide the path-resolved turbulence measurements associated with at least the test article.

18. The apparatus of claim 17, comprising further program instructions executable by the processing system to direct the processing system to at least:
obtain at least an indication of an undeflected test beam determined during a calibration operation for the test volume having no test article;
process the indications of the different angles relative to at least the indication of the undeflected test beam to determine the path-resolved turbulence measurements.

19. The apparatus of claim 17, comprising further program instructions executable by the processing system to direct the processing system to at least:
correct for a defocused beam projected onto the detector positioned offset from an image plane of the multiple test beams.

20. The apparatus of claim 17, wherein the digital representation of the interference pattern comprises a holographic representation.

* * * * *